United States Patent [19]

Henne et al.

[11] 4,276,172
[45] Jun. 30, 1981

[54] CELLULOSIC MEMBRANE FOR BLOOD DIALYSIS

[75] Inventors: Werner Henne; Gustav Dünweg, both of Wuppertal, Fed. Rep. of Germany

[73] Assignee: Akzo N.V., Arnhem, Netherlands

[21] Appl. No.: 875,926

[22] Filed: Feb. 7, 1978

[30] Foreign Application Priority Data

Feb. 11, 1977 [DE] Fed. Rep. of Germany ....... 2705733
Feb. 11, 1977 [DE] Fed. Rep. of Germany ....... 2705735

[51] Int. Cl.³ .................... B01D 31/00; B01D 13/00
[52] U.S. Cl. ................................. 210/490; 210/500.2
[58] Field of Search ............. 210/500 M, 490, 321 R; 264/173

[56] References Cited

U.S. PATENT DOCUMENTS

| | | | |
|---|---|---|---|
| 3,276,996 | 10/1966 | Lazare | 210/500 M X |
| 3,600,487 | 8/1971 | Zavasnik | 264/173 X |
| 3,673,612 | 7/1972 | Merrill et al. | 210/321 X |
| 3,888,771 | 6/1975 | Isuge et al. | 210/500 M |
| 4,061,461 | 12/1977 | Hessenthaler | 264/173 X |
| 4,071,590 | 1/1978 | Strathmann | 210/500 M X |
| 4,127,625 | 11/1978 | Arisaka et al. | 210/500 M X |

OTHER PUBLICATIONS

Merrill, et al., "Antithrombogenic Cellulose Membranes for Blood Dialysis," from vol. XII, Trans. Amer. Soc. Artif. Int. Organs, 1966, pp. 139-150.

*Primary Examiner*—Frank A. Spear, Jr.
*Attorney, Agent, or Firm*—John H. Shurtleff

[57] ABSTRACT

A multilayer cellulosic membrane for blood dialysis and a method for the production of said membrane by regeneration from separately extruded cuprammonium cellulose solutions brought together to form two or more permanently adhered layers, each layer forming a seal against blood penetration through the leakage points of an adjacent layer, the resulting multilayer membrane thus being substantially free of blood leakage over the total thickness of the membrane. Especially preferred membranes for blood dialysis are those in which the layer arranged on the blood side of the diaphragm contains a modified cellulose chemically bound with an antithrombogenic substance.

17 Claims, 5 Drawing Figures

CELLULOSIC MEMBRANE FOR BLOOD DIALYSIS

As dialysis membranes for use in artificial kidneys, those of regenerated cellulose from a cuprammonium solution are of particular importance because their hydrodynamic and diffusive permeability have the correct relationship for metabolites of the human organism, i.e., with respect to the products of intermediary metabolism found in the human bloodstream. Such membranes for blood dialysis are generally produced with a wall thickness of 5 to 100 $\mu$m. However, dialysis membranes have also been produced which are less than 5 $\mu$m in thickness.

When using dialysis membranes which have been made of cellulose by precipitation from a cuprammonium solution, the danger exists of the appearance of leakage points which arise because undissolved portions of $Cu(OH)_2$ and $SiO_2$ as impurities in the high viscosity cellulose solutions are very difficult to separate or remove. Such particles with a size of about 1 to 10 $\mu$m remain in the membrane and cause points of leakage due to penetration of the membrane in the course of its use. Such leakage points represent a serious danger for patients and could lead to life threatening situations.

It is also known that dialysis membranes of regenerated cellulose when used in artificial kidneys can very easily bring about a coagulation of the blood if preventive measures are not undertaken by means of a suitable medicating treatment. However, it is also further recommended in German Pat. No. (DT-OS) 17 20 087 that in order to reduce the danger of blood coagulation, the polymer material of the membrane may be reacted with an alkyl halide and the resulting material then further reacted with an alkali salt of an anticoagulant, i.e., an antithrombogenic compound having a cationic radical, e.g., heparin or a heparinoid compound. In addition to alkylhalides, it is also possible to use in this procedure haloalkyldialkylamines. Cellulose and especially cellulose acetate are considered to be suitable polymers for the membrane.

If one attempts to apply the known processes to such cellulose materials as are obtained by regeneration according to the cuprammonium process, for example by modifying the cellulose before the regeneration and then reacting it after regeneration with an antithrombogenic compound, then a membrane material is obtained which has an extremely low strength and many points of leakage. The wet fastness amounts to only about 0.1 kg/mm$^2$ so as to fall at the lower limit of strength required as a very minimum when using the material as a dialysis membrane. These difficulties cannot be overcome by modifying only a portion of the cellulose converted in the cuprammonium solution. While this partial treatment increases the strength of the membrane, the antithrombogenic effect is considerably reduced.

Previous attempts have been made to prevent the danger of leakage points in the dialysis membranes as extensively as possible by means of very exact controls, but this approach has not been successful since it is very expensive and does not give the required degree of safety.

It is an object of the present invention to provide a cellulosic membrane for the dialysis of blood which effectively removes the danger of leakage points. A further object of the invention is to permit a chemical modification of the cellulosic membrane without influencing its desirable properties such as an adequate tensile strength. More particularly, it is advantageous to modify the chemical structure of the cellulose in the membrane so that it will react with an antithrombogenic substance.

In accordance with the invention, it has now been found that the problems presented in this art have been solved by providing a multilayer cellulosic membrane for blood dialysis formed by regeneration from a cuprammonium solution in at least two separately extruded or spun layers which are firmly and permanently adhered together, the resulting multilayer membrane being substantially free of leakage points. The layer arranged on the blood side or so-called retentate side of the membrane preferably consists at least partly of a modified cellulose, especially so as to become chemically bound with an antithrombogenic substance.

With a laminated type of construction of the dialysis membrane in which two or more layers are superimposed and securely adhered to each other, fine particles of an undissolved solid substance can still occur as an impurity in each of the cellulosic layers, but such particles will at most perforate only that layer in which they are embedded. Preferably, the retentate or blood side layer is thinner than the other layer or layers on the dialysate side. Even with such thin layer construction, a perforation through the entire laminated wall of the membrane does not occur so that leakage points are essentially eliminated. A complete perforation or leakage point could theoretically occur only if undissolved particles became fixed or located by chance at exactly the same point in all of the superimposed layers. In practice, such a relatively unusual occurrence is still further prevented by the fact that during the extrusion or pressing out of the cuprammonium cellulose solution from a spinning nozzle, the particles are displaced from one another and in such a manner that it is practically impossible for the particles to become fixed at the same location, i.e., in superimposed alignment from layer to layer. The extrusion or spinning process of this invention is therefore important in this desirable dispersion or "disalignment" of solid, particulate impurities in the cellulosic layers of the dialysis membrane.

In many cases, it is desirable and particularly advantageous for influencing the blood dialysis properties of the membrane, e.g., its thrombogenic properties, or for other reasons, to add a modified cellulose such as for example an esterified or etherified cellulose or else to modify the cellulose chemically in some other manner. In such cases, it is often unnecessary to produce the entire membrane wall out of the modified cellulose. Therefore, in the development of the present invention, it has been found most advantageous to provide a layer on the retentate or blood side of the dialysis membrane consisting partly or completely of a modified cellulose.

In particular, the present invention makes possible a membrane for blood dialysis produced from a regenerated cellulose and still having a reduced thrombogenic effect, i.e., a much lower tendency to cause blood coagulation. Moreover, the dialysis membrane of the invention can be produced by regeneration from cuprammonium cellulose solutions so as to exhibit a high mechanical strength even when incorporating a modified cellulose. In addition, the dialysis performance at normal ultrafiltration capacity as used in artificial kidneys is quite high, and the greatest possible antithrombogenic effect is demonstrated by the preferred membranes of the invention.

Such a preferred dialysis membrane consists of two or more superimposed and tightly adhered layers composed of a cellulose regenerated from cuprammonium cellulose solutions wherein the cellulosic layer on the retentate or blood side of the membrane is composed of a modified cellulose which contains a suitable antithrombogenic substance chemically bound therewith. A blood dialysis membrane constructed in this manner has the same antithrombogenic effect as a dialysis membrane made completely of modified cellulose and containing the same antithrombogenic substance in chemical combination. The mechanical strength of the dialysis membrane according to the invention is however reduced only slightly in comparison to a membrane made of non-modified cellulose, while the antithrombogenic effect and the dialysis capacity fully meet the requirements of artifical kidney machines.

The layer thickness of the cellulosic layer arranged on the blood side of the membrane can be kept quite small, and it is quite possible to construct this layer with a thickness of about 1 to 5 $\mu$m without reducing the antithrombogenic effect by any appreciable extent. Since a 5 $\mu$m thick layer of the non-modified cellulose in the membrane provides a sufficient tensile strength, the dialysis membrane of the invention is preferably formed such that the layer thickness of the modified cellulose on the blood side amounts to about 10 to 50% of the entire wall thickness.

Although various modification of cellulose can be readily selected by those skilled in this art, it has been found to be especially advantageous for purposes of preparing a blood dialysis membrane according to the present invention to use a dialkylaminoalkyl cellulose, especially wherein the alkyl members are lower alkyl such as methyl, ethyl and propyl. Of these modified cellulosic materials, the diethylaminoethyl cellulose has proven to be especially suitable. In these preferred modified cellulosic materials, the degree of substitution of the cellulose should amount to between about 0.1 and 3.0, based upon the total glucose anhydride units of the cellulose in the modified layer. The term "degree of substitution" is thus used herein to designate the number of dialkylamino groups for each unit of glucose anhydride of the cellulose. The modified cellulose can be used as such in forming the particular membrane layer or it may also be used in admixture with a pure cellulose. The degree of substitution in the layer can then also be varied by adjusting the mixing proportions of the pure and modified cellulose materials used in forming the layer.

The term "antithrombogenic" is used herein to refer to that class of natural and synthetic materials which are known to exhibit an anticoagulating effect in the bloodstream. The best known anticoagulant for this purpose and also for the present invention is the compound heparin, which is a highly sulfated dextro-rotary mucopolysaccharide composed of D-glucoseamine and D-glucuronic acid residues and having a molecular weight on the order of about 6,000 to 20,000. For the present invention, those fractions of high molecular weight are especially suitable. Other useful antithrombogenic substances, i.e., anticoagulants for blood, include acetylsalicylic acid, dicumarol and phenylpropyl-4-hydroxycoumarin. The present invention, by suitable modification of the cellulose, permits any of these well known anticoagulants to be chemically bound to the cellulose in the dialysis membrane.

It is well known that heparin can be bonded onto or chemically combined with many polymers which otherwise would cause the formation of a thrombus, i.e., a blood clot, in an organism such as in the bloodstream of a human being. This incorporation of heparin into a polymer has therefore been used to avoid the risk of a thrombosis, e.g., as described for example in "Chemical and Engineering News," Vol. 44, No. 15, page 37 (1966).

The dialysis membranes according to the present invention can be produced in all of the usual shapes or configurations, i.e., as flat sheets or films, as tubular foils or as hollow fibers. Most artificial kidneys are constructed according to one of two basic designs, one using flat membranes and the other using tubular membranes, i.e., either a flexible tubular foil or a plurality of hollow fibers. Reference is made to the prior art for a more detailed discussion of the overall structure and operation of artificial kidney machines.

A preferred embodiment of the dialysis membrane according to the invention is a tubular foil which preferably has a breadth of 100 to 250 mm with a total wall thickness of the membrane of about 10 to 100 $\mu$m. Tubular foils in which blood flows through the interior of the tube are especially advantageous in comparison to flat sheets or films because the layer arranged on the blood side is more fully protected from damage and harmful influences of the surroundings during installation and use of the dialysis apparatus.

The reaction of the modified cellulose layer arranged on the blood side of the membrane with the antithrombogenic substance, i.e., the anticoagulant compound or polymer, preferably takes place immediately prior to use of the membrane for blood dialysis in order to avoid any loss of the effectiveness of the anticoagulant through the storage of the membrane. Moreover, the reaction can be carried out more simply after the membrane has been installed in the dialysis apparatus, i.e., the dialyzer, without the greater expense of additional apparatus. It is therefore most convenient and least costly to delay the introduction of the anticoagulant until this later point of time just before using the dialyzer.

More recently, artificial kidneys have increasingly gained acceptance wherein the dialysis membranes are formed as hollow fibers. The greatly reduced size of the dialyzer structure which can be achieved by the use of such hollow fibers opens up the possibility of providing artificial kidneys capable of being managed by the patients themselves. The most significant problem in the use of these hollow fiber membranes is the formation of blood clots in the relatively restricted interior duct or central axial channel of each hollow fiber.

The dialysis membranes of the present invention can be constructed as hollow fibers with a pronounced improvement in preventing blood clots by the preferred incorporation of an antithrombogenic substance as described herein. In general, the diameter of the hollow fibers amounts to about 50 to 1,000 $\mu$m with a total wall thickness of about 5 to 100 $\mu$m. Individual layers in the hollow fibers are arranged substantially concentrically around the longitudinal axis of each fiber, e.g. in the nature of a bicomponent or multicomponent hollow fiber where there are two or more layers, each layer appearing as an annular ring in cross-section. These individual layers will generally have a thickness of approximately 1 to 3 $\mu$m, the innermost layer preferably being equal to or thinner than the outermost layer or layers such that a modified cellulosic innermost layer will provide about 10 to 50% of the total wall thickness of each hollow fiber.

It is also an object of the present invention to provide a process for the production of the multilayer cellulosic membranes for the dialysis of blood. This process or method of producing the multilayered or laminated membranes has also been disclosed in a copending application with other joint inventors, namely Ser. No. 809,486, filed June 23, 1977, now U.S. Pat. No. 4,164,437, wherein substantially the same method is used but with the incorporation of an adsorbent material, especially an active carbon, aluminum oxide, zirconium oxide, zirconium oxide, zirconium phosphate, silicic acid and/or silicates, all in very finely divided form. The method or process developed in the present invention is of particular significance in permitting this special addition of one or more adsorbents while still preventing and substantially completely eliminating leakage points.

The process of the present invention has been developed for general application to the production of improved cellulosic membranes for blood dialysis, especially membranes which have an adequate mechanical strength and no leakage points, said process including the steps of extruding or pressing out at least two separate cuprammonium solutions from differently fed extrusion slots arranged adjacently one another in a spinning nozzle, each slot forming a separate spun cellulosic layer, conducting the spun layers together for layer to layer contact directly after emergence from the spinning nozzle, i.e. so that the layers are immediately joined side by side, and then conducting the layers, after passage through an air gap of at most 15 to 1500 times the distance between the adjacent slots, directly into a precipitation bath for coagulation of each layer and for permanent adherence of the layers to each other.

For the production of flat films and tubular foils from relatively large spinning nozzles, the air gap is preferably about 15 to 50 times the distance of the nozzle slots from each other. On the other hand, for the production of hollow fibers or filaments from relatively small concentric annular slots, the air gap is preferably about 150 to 500 times the distance of the adjacent slots from each other. It will be understood that the distance of the nozzle slots from each other can vary within a wide range since this distance or spaced interval is adjusted to the requirements of the existing apparatus and the specific type of membrane being produced. Reference is made to said copending application, Ser. No. 809,486, and to the prior art for conventional spinning apparatus using parallel film- or sheet-forming slots to produce individual flat sheets, foils or films as well as the preferred concentric oval or circular slots used to produce tubular foils or hollow fibers.

The further working up of the spun multilayered cellulosic membranes can take place in a manner analogous to the known procedures of the cuprammonium process, and it is possible to make use of the same precipitation baths and wash liquids as are known in the conventional cuprammonium process. See for example such standard texts as Carroll-Porczynski, "Natural Polymer Man-Made Fibres," Academic Press, N.Y. (1961), especially Chapter 7 thereof.

The thickness of the individual layers forming the dialysis membrane is influenced by the breadth of the corresponding extrusion or spinning slot, by the viscosity of the cuprammonium cellulose spinning solution and by the length of the air gap between the face of the spinning nozzle where the layers emerge and the surface of the precipitation or coagulation bath. For purposes of the present invention, this air gap preferably corresponds closely to the air gap spanned by the extruded or spun layers after they have been joined together side by side a short distance below the face of the spinning nozzle. The freshly spun layers are essentially self-adhering so as to be drawn together close to the spinning head or nozzle face as the layers emerge in close proximity to one another.

For the production of a dialysis membrane having one layer on the blood or retentate side consisting partly or wholly of a modified cellulose, it is of course necessary to use at least one cuprammonium solution containing the modified cellulose for extrusion through one slot of the spinning nozzle. Again, this modified cellulose is preferably one which is reactive with a suitable antithrombogenic substance such as heparin so that this substance as an anticoagulant can be later introduced into the modified layer.

The dialysis membrane built up from a plurality of layers of a regenerated cellulose according to the invention fulfills the requirements made of membranes for blood dialysis both with regard to ultrafiltration capacity and also with regard to clearance values. By means of the present invention, it has become possible when using a cellulose regenerated by the cuprammonium process to prevent leakage points in the membrane, thereby providing a very considerable increase in the safety of operation of any blood dialyzer equipped with the improved multilayer cellulosic membranes of the invention. The safety of hollow fiber membranes is particularly improved over previous cuprammonium cellulose hollow fibers.

The invention is further illustrated by the following examples of especially preferred embodiments of the membranes having at least two layers of a regenerated cuprammonium cellulose, the layer on the blood side being a modified cellulose.

EXAMPLE 1

Production of the modified cellulose spinning solution

As a modified cellulose, diethylaminoethylcellulose with a degree of substitution of 2.5 is dissolved in a cuprammonium solution, i.e. an ammoniacal copper oxide solution, to provide a cellulose content of 9% by weight. After filtration of this solution, it is dosed with a cuprammonium cellulose solution in the ratio of 1:5 under an efficient mixing which guarantees a homogenous mixture.

Such a mixed cuprammonium cellulose solution exhibits a degree of substitution of 0.5 and could in fact be used to prepare a single layer membrane for the dialysis of a liquid. However, the wet strength of such a membrane amounts to only about 0.1 g/mm$^2$ and therefore is incapable of being used as a membrane for blood dialysis. In addition, such a membrane contains a large number of leakage points which exclude it from use for blood dialysis.

EXAMPLE 2

Production of a two-layer tubular foil.

The cuprammonium cellulose solution prepared according to Example 1, containing the modified cellulose, is fed to the inner annular slot of a spinning nozzle adapted to extrude a two-layer tubular foil while a separate cuprammonium solution of a pure, i.e. non-modified, cellulose is fed to the outer annular slot. (See, for example, FIG. 2 below using only two of the annular slots 8a and 8a' with their corresponding feed channels 8 and 8'.) The two cuprammonium feed solutions are extruded downwardly through these annular slots into a conventional precipitation bath therebelow for coagulation of the combined layers. By feeding a gas or a liquid, e.g. water, as a filling into the hollow interior of the freshly extruded foil tube (using a central pipe connection such as conduit 9 in FIG. 2), the inner layer can be firmly pressed and solidly connected to the outer layer during the spinning and coagulation procedure. The tubular foil is thus pressurized from within during its formation to ensure a continuous joining of at least two spun layers as they are conducted side by side from the spinning nozzle into the precipitating bath.

The air gap over which the freshly spun layers run from the spinning nozzle to the surface of the precipitation bath has a length corresponding to 30 times the distance between the two spinning slots. Within the precipitation bath, the tubular foil is laid flat as it is conducted around a deflection roller placed in the bath in a conventional manner. By closing off the withdrawn end of the foil tube, the filler liquid or gas is trapped inside to maintain the inner pressure needed to form the self-adhering layers during the initial stages of spinning, conducting over the air gap and coagulating in the bath liquid.

The sealing off of the withdrawn end of the foil tube can be accomplished in part by the deflection roller or preferably by means of additional nip rollers arranged after the deflection roller in the precipitation bath or outside of the bath as the foil tube is being transported in a more flattened condition. The liquid or gas can be partly discharged during this withdrawal of the foil tube or it can be maintained within the tube during subsequent treatment and storage.

Once the tubular foil has been coagulated or substantially solidified in the precipitation bath, it is then washed, dried and wound for storage in a manner which is quite conventional in the cuprammonium process. The resulting product as prepared by this example has a wet fastness of 0.7 g/mm$^2$ and is substantially free of leakage points.

EXAMPLE 3

Production of a bicomponent hollow fiber.

The cuprammonium solution prepared according to Example 1, containing the modified cellulose, is fed to the inner annular slot of a spinning nozzle adapted to extrude a bicomponent hollow fiber while a separate cuprammonium solution of the pure or non-modified cellulose is fed to the outer annular slot. (See, for example, FIG. 1 of the accompany drawing wherein the spinning nozzle 1 has the inner annular slot 2a and the outer annular slot 2a' with the corresponding feed channels 2 and 2'.) In order to pressurize the hollow fiber from within, i.e. by means of a fluid introduced into its hollow interior or central axial duct, there is fed in this case liquid isopropyl myristate through the center bore or conduit 6 of the spinning nozzle 1, this bore being reduced in size at 6a where it opens on the face of the nozzle. This liquid isopropyl myristate remains in the hollow fiber during its production by sealing off the lead end or first recovered fiber and is separated and recovered only after the hollow fiber is completely produced. In fact, both ends of the hollow fiber can be sealed off to retain the liquid isopropyl myristate in the central axial duct of the fiber until it is used in the dialyzer. Again, it should be noted that the pressure exerted by the fluid in the axial duct not only assists in forming the hollow fiber but also ensures a firm bond between adjacent annular layers of the hollow fiber membrane.

In comparison to other fluids which may be injected into a hollow fiber, such as halohydrocarbons, toluene, phenols, etc., isopropyl myristate has the advantage that it is completely insoluble in water and has a viscosity of 3—4 cP which is higher than that of water. Also, isopropyl myristate is easily removed with ethanol in which it is readily soluble. Furthermore, isopropyl myristate is non-toxic and compatible with blood, and in other respects, this particular compound is easily handled and capable of being used in the spinning of hollow fibers with great safety under normal processing conditions.

After leaving the spinning nozzle 1, the hollow fiber travels through an air gap of about 320 times the distance of the annular nozzle slots from each other before entering the surface of the precipitation bath arranged below the spinning nozzle. Again, a conventional precipitation bath is used for regenerating the cellulose from the spun and joined layers of cuprammonium solution. Following the coagulation and at least partial solidification of the hollow fiber, it can be deflected in the precipitation bath and then removed and subjected to the usual washing and drying steps.

Although this example refers to a single hollow fiber, it will be understood that a plurality of such hollow fibers or hollow filaments can be continuously spun as bi- or multi-component fibers from the same spinning head or nozzle 1 and then coagulated in the same precipitation bath so as to be collected as a multifilament thread or yarn.

The final product is preferably wound on a take-up spool or reel and stored for future use as a multilayer membrane for blood dialysis. The product of this Example 3 exhibits a strength of 0.75 g/mm$^2$.

In both of the preceding examples, the thickness of each layer of the particular dialysis membrane being formed can be varied by adjusting the proportion of the cuprammonium cellulose solution being fed and extruded through the adjacent annular slots. In FIG. 3, the hollow fiber produced with the spinning nozzle 1 of FIG. 1 has an inner annular layer 3 on the blood side which is approximately the same in thickness as the outer annular layer 3' on the dialysate side of the membrane. Preferably, however, the inner blood side layer is thinner than the outer dialysate side layer or layers, for example as illustrated by the three-layer tubular foil membrane shown in FIG. 4 as produced with the spinning nozzle 7 of FIG. 2. In this FIG. 4, the innermost layer 4 is about one-half the thickness of the combined outer layers 4' and 4". In both cases, The inner layer 3 of FIG. 3 and the inner layer 4 of FIG. 4 is most desirably produced from a modified cellulose which has the capacity to take up and chemically bind an antithrombogenic substance.

EXAMPLE 4

Use of the multilayer cellulosic membrane for blood dialysis.

In this example, use is made of a bundle of hollow fibers or filaments as produced according to Example 3, i.e. in the form of bicomponent hollow fibers (FIG. 3), which are installed in a hollow fiber dialyzer. Prior to its use with a patient, the dialyzer which has been stored and transported to the clinic in the dry state is first subjected to treatment of the hollow fibers by conducting therethough for about ½ hour a stream of a 0.1% sodium heparin solution in a physiological sodium chloride solution. After this treatment, the hollow fibers are flushed with the same physiological salt solution (½ liter) until no heparin can be detected in the solution. The dialysis membrane then contains only chemically bound heparin and is ready for connection to the patient. With this dialyzer, equipped with hollow fiber dialysis membrane of the invention, the previously essential heparin dosage directly into the blood circulation of the patient could by distinctly reduced, i.e. to a slight fraction, without any danger of bringing about a coagulation of the blood or a clogging of the hollow fiber membranes. Furthermore, with the help of the dialysis membrane of the invention, it is possible to also substantially reduce the latent danger of internal bleeding.

The invention is further illustrated but not restricted by the embodiments shown in the accompanying drawing in which.

Figure 1:
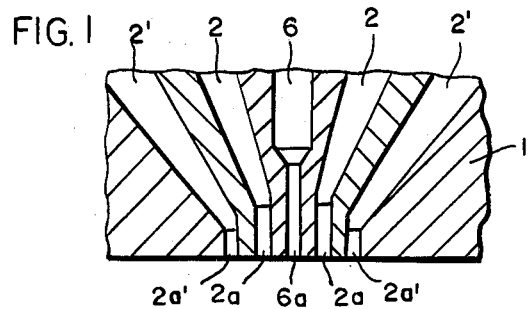
FIG. 1 is a fragmentary cross-sectional view along the spinning axis of one spinning nozzle for the production of a bicomponent hollow fiber membrane according to the invention.
Figure 2:
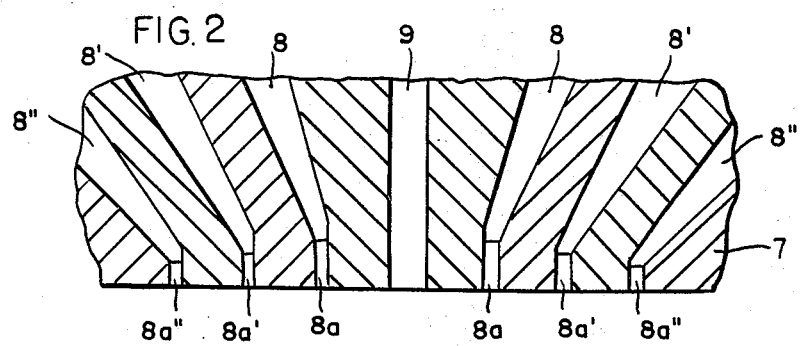
FIG. 2 is a fragmentary cross-sectional view along the spinning axis of another spinning nozzle for the production of a tubular foil dialysis membrane according to the invention.

Referring first to FIGS. 1 and 2, the spinning nozzles 1 and 7 are represented by a fragment of their face plates in a standard spinning heat unit. FIG. 1 illustrates one position of forming a hollow fiber wherein one cuprammonium cellulose solution is introduced through the feed channels 2 for extrusion through the inner annular slot 2a while a different cuprammonium cellulose solution is fed by channels 2' for extrusion through the outer annular slot 2a', these two slots being arranged in concentric circles or rings about the spinning axis. A central conduit or bore 6 and 6a supplies a fluid, especially isopropyl myristate, into the hollow interior or central axial duct of the hollow fiber so as to press the inner extruded layer of cellulosic material outwardly in adhering contact with the outer extruded layer of another cellulosic material. For blood dialysis, hollow fibers are preferred with a modified cellulose solution being extruded from the inner annular slot 2a while a pure or essentially non-modified cellulose is extruded through the outer annular slot 2a'.

Figure 4:
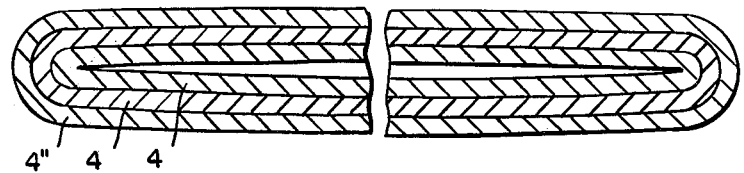
FIG. 4 is a cross-sectional view of a three-layer tubular foil as produced with the spinning nozzle of FIG. 2.

The same construction is followed in the three-layer spinning nozzle of FIG. 2 for the production of a tubular foil as shown in FIG. 4. In this case, the central bore or conduit 9 is used to introduce a gas or liquid, e.g. water, as a filling fluid into the hollow interior of the foil tube. The feed or distibution channels 8, 8' and 8" conduct at least two different cuprammonium solutions to the respective annular extrusion slots 8a, 8a' and 8a" arranged on the face of the nozzle plate 7. Here again, the inner slot 8a is used to extrude or press out a modified cellulose in one cuprammonium solution while a preferably non-modified cellulose is extruded with a different cuprammonium solution from each of the outer annular slots 8a' and 8a".

The spinning nozzles 1 and 7 are connected in the usual manner to a pump means for each of the separate solutions, so that the amount of solution fed to each extrusion slot can be easily regulated and the thickness of each layer adjusted in a conventional manner.

Figure 3:
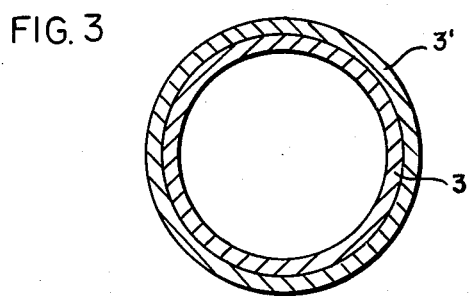
FIG. 3 is a cross-sectional view of a bicomponent hollow fiber membrane as produced with the spinning nozzle of FIG. 1.

In the hollow fiber membrane of FIG. 3, the inner layer 3 is the modified cellulose layer while the outer layer 3' is the non-modified cellulose layer. In the tubular foil membrane of FIG. 4, the innermost layer 4 is made of the modified cellulose while the next two outer layers 4' and 4" are made of a non-modified cellulose. In the flat sheet membrane of FIG. 5, the upper layer 5 is the modified cellulose layer on the blood side of the membrane while the lower layer 5' is the non-modified layer.

Figure 5:
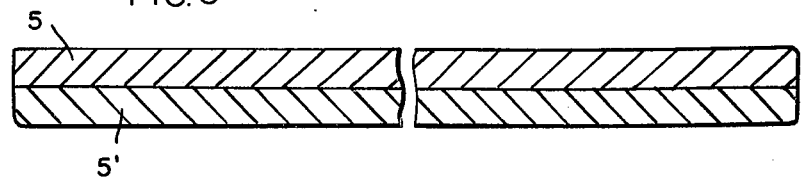
FIG. 5 is a cross-sectional view of a flat sheet or film dialysis membrane which can be produced with a conventional spinning nozzle having adjacent and parallel film-forming slots.

Referring to all of FIGS. 3, 4 and 5, the modified cellulose layers in each instance, i.e. 3, 4 and 5, respectively, are on the blood or retentate side of the membrane to be used for the dialysis of blood and preferably contain or permit a chemical combination therewith of a suitable antithrombogenic substance such as heparin. The remaining layer or layers in each instance are made of the non-modified cellulose to provide the dialysate side of each membrane.

The installation and use of these membranes in an artificial kidney or similar machine for the dialysis of blood is conventional but the results achieved with the membranes of the present invention, using cellulose regenerated from at least two different cuprammonium solutions, are far superior to prior results using only a single layer of regenerated cellulose under otherwise identical conditions. Moreover, the important advantage of incorporating an antithrombogenic substance such as heparin or a similar anticoagulant is accomplished more effectively and without any of the usual dangers of blood clots, internal bleeding, loss of strength of the membrane or a total breakdown due to uncontrolled leakage points. The substantial improvements offered by the present invention are especially significant in the preferred use of hollow fiber membranes but are also of importance with the less preferred tubular foil or flat sheet membranes.

The invention is hereby claimed as follows:

1. A dialyzing membrane for blood dialysis consisting essentially of a cuprammonium regenerated cellulose having a total membrane thickness of about 5 to 100 μm with at least two layers which have been separately extruded and then immediately joined together in side by side relationship for coagulation in a precipitation bath and for permanent adherence of the layers to each other, each layer thereby being formed as a seal against the penetration of blood through the leakage points of an adjacent adhered layer.

2. A membrane as claimed in claim 1 in which that layer arranged on the blood side of the dialysis membrane consists at least partly of a modified cellulose.

3. A membrane as claimed in claim 2 in which said modified cellulose layer contains chemically bound with the cellulose an antithrombogenic substance.

4. A membrane as claimed in claim 3 in which said modified cellulose layer amounts to 10 to 50% of the total wall thickness of the membrane.

5. A membrane as claimed in claim 2 in which said modified cellulose layer is a dialkylaminoalkyl cellulose having a degree of substitution of about 0.1 to 3.

6. A membrane as claimed in claim 5 in which said modified cellulose layer amounts to 10 to 50% of the total wall thickness of the membrane.

7. A membrane as claimed in claim 2 in which said modified cellulose layer amounts to 10 to 50% of the total wall thickness of the membrane.

8. A membrane as claimed in claim 1 constructed as a tubular foil.

9. A membrane as claimed in claim 1 constructed as a hollow fiber.

10. A multilayer cellulosic membrane for blood dialysis as claimed in claim 1, said membrane being regenerated from a cuprammonium cellulose solution in at least two separately extruded and permanently adhered layers in the form of a tubular foil, the innermost layer on the blood side of the dialysis membrane consisting at least partly of a dialkylaminoalkylcellulose having a degree of substitution of about 0.1 to 3.

11. A membrane as claimed in claim 10 wherein said dialkylaminoalkylcellulose is diethylaminoethylcellulose.

12. A membrane as claimed in claim 10 wherein said innermost layer has a thickness of about 1 to 5 μm and provides about 10 to 50% of the total wall thickness of the membrane.

13. A multilayer cellulosic membrane for blood dialysis as claimed in claim 1, said membrane being regenerated from a cuprammonium cellulose solution in at least two separately extruded and permanently adhered layers in the form of a hollow fiber, the innermost layer on the blood side of the dialysis membrane consisting at least partly of a dialkylaminoalkylcellulose having a degree of substitution of about 0.1 to 3.

14. A membrane as claimed in claim 13 wherein said dialkylaminoalkylcellulose is diethylaminoethylcellulose.

15. A membrane as claimed in claim 13 wherein said innermost layer has a thickness of about 1 to 5 μm and provides about 10 to 50% of the total wall thickness of the membrane.

16. A membrane as claimed in claim 1 in the form of a hollow fiber having a diameter of about 50 to 1,000 μm and a total wall thickness of about 5 to 100 μm.

17. A membrane as claimed in claim 16 wherein the innermost layer of the hollow fiber is equal to or thinner than the outer layer or layers and has a thickness of about 1 to 5 μm.

* * * * *